United States Patent [19]
Bodine et al.

[11] Patent Number: 5,601,896
[45] Date of Patent: Feb. 11, 1997

[54] FABRIC-COVERED BOARD STRUCTURE AND PROCESS OF MANUFACTURE

[75] Inventors: Darryl C. Bodine; Harold N. Graybeal, both of Lancaster, Pa.; Nancy E. Mentzer, Macon, Ga.

[73] Assignee: Armstrong World Industries, Inc., Lancaster, Pa.

[21] Appl. No.: 37,606

[22] Filed: Mar. 25, 1993

[51] Int. Cl.⁶ .............................. B32B 1/04; B32B 3/28; B32B 31/00
[52] U.S. Cl. .............................. 428/68; 428/73; 428/74; 428/161; 428/167; 428/173
[58] Field of Search .................... 428/68, 73, 74, 428/161, 167, 173; 156/268

[56] References Cited

U.S. PATENT DOCUMENTS

| 4,429,012 | 1/1984 | Danko ................................... 428/167 |
| 5,153,048 | 10/1992 | Fry et al. .............................. 428/167 |

Primary Examiner—Thurman K. Page
Assistant Examiner—Kathryne E. Shelborne

[57] ABSTRACT

Disclosed is a fabric-faced wallboard product having a modular appearance and a method for preparing the composite product without using separate modules. By tucking the fabric into a grooved surface of the board, the appearance of a plurality of individual blocks, sections or modules is provided.

2 Claims, 3 Drawing Sheets

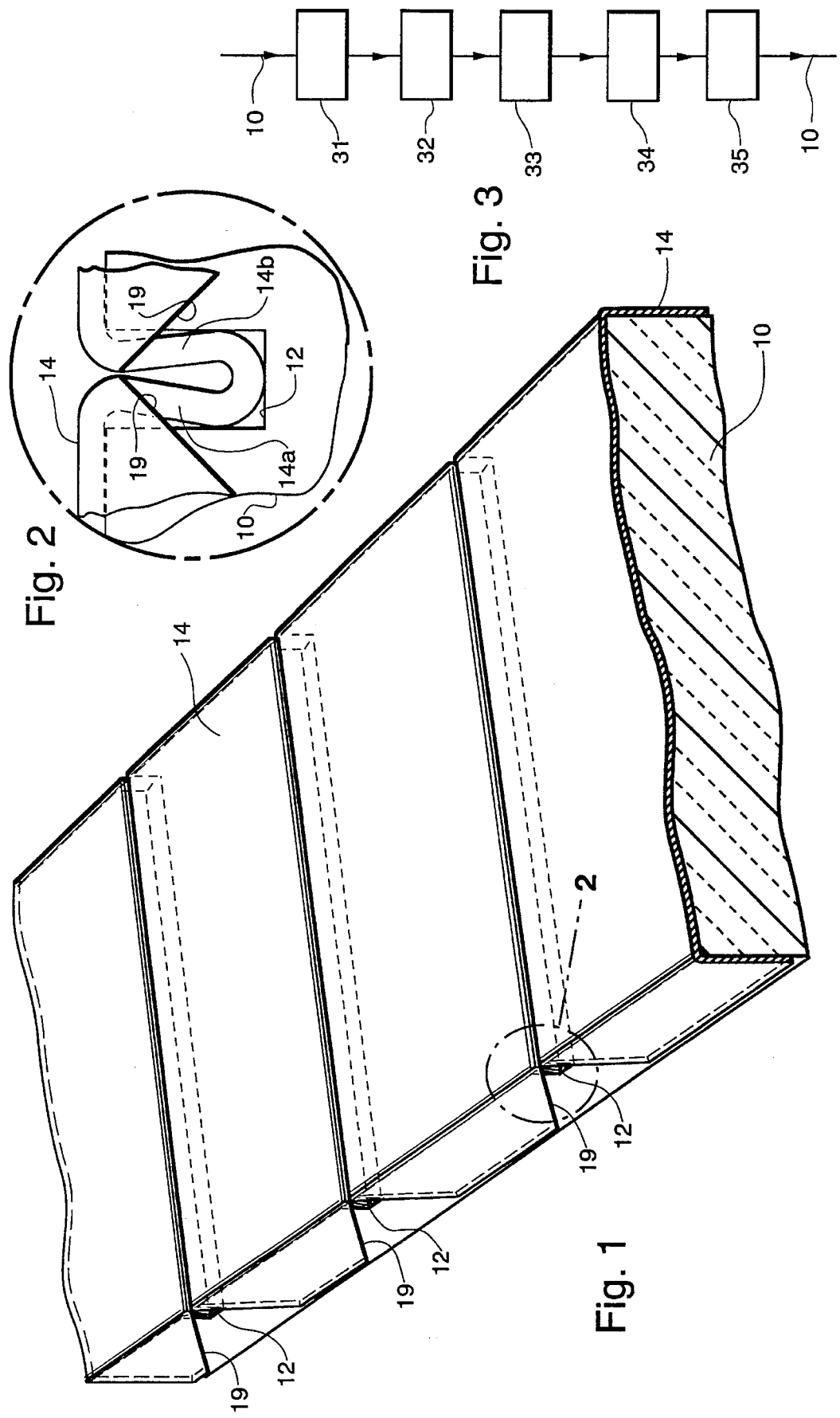

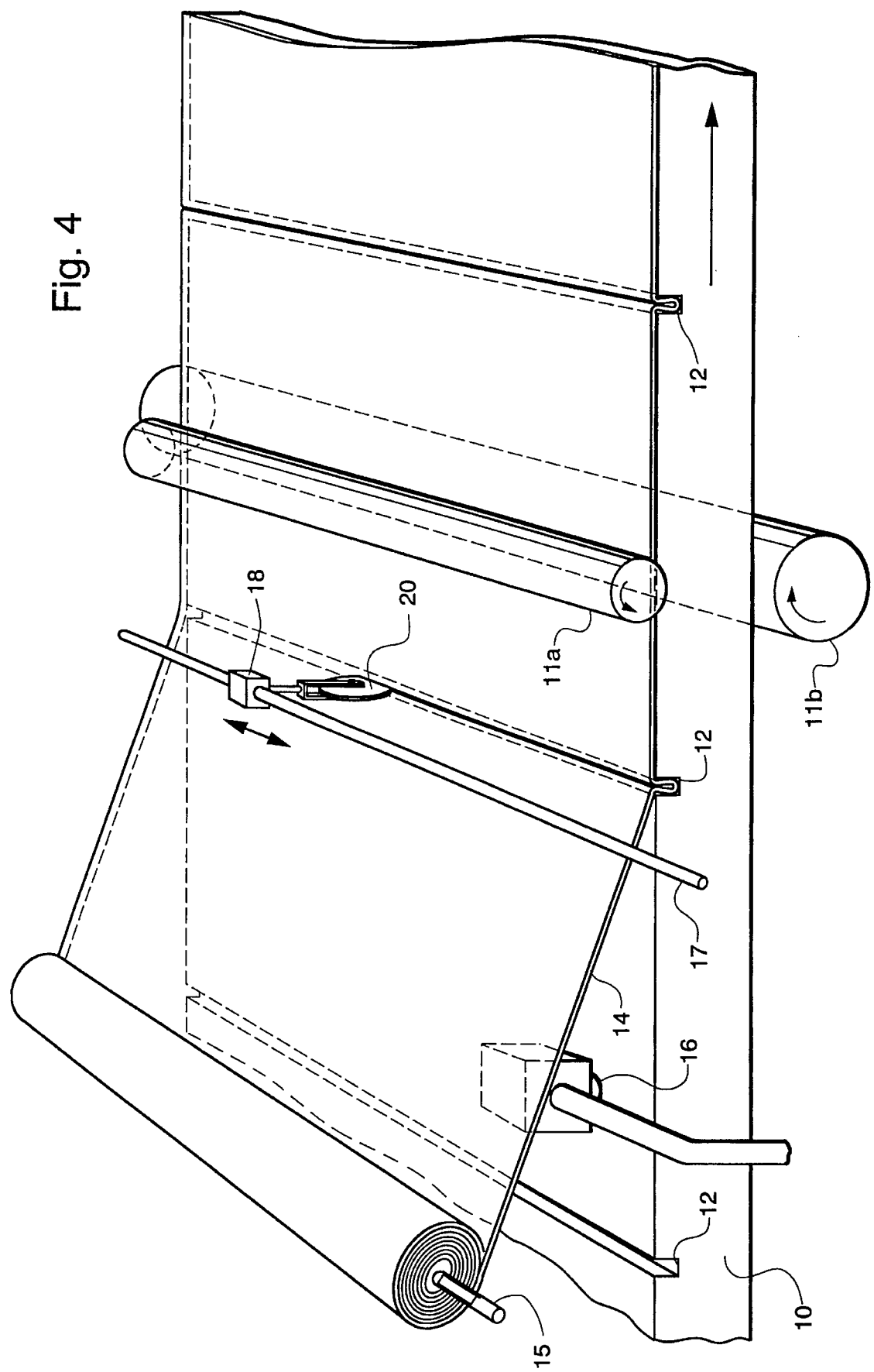

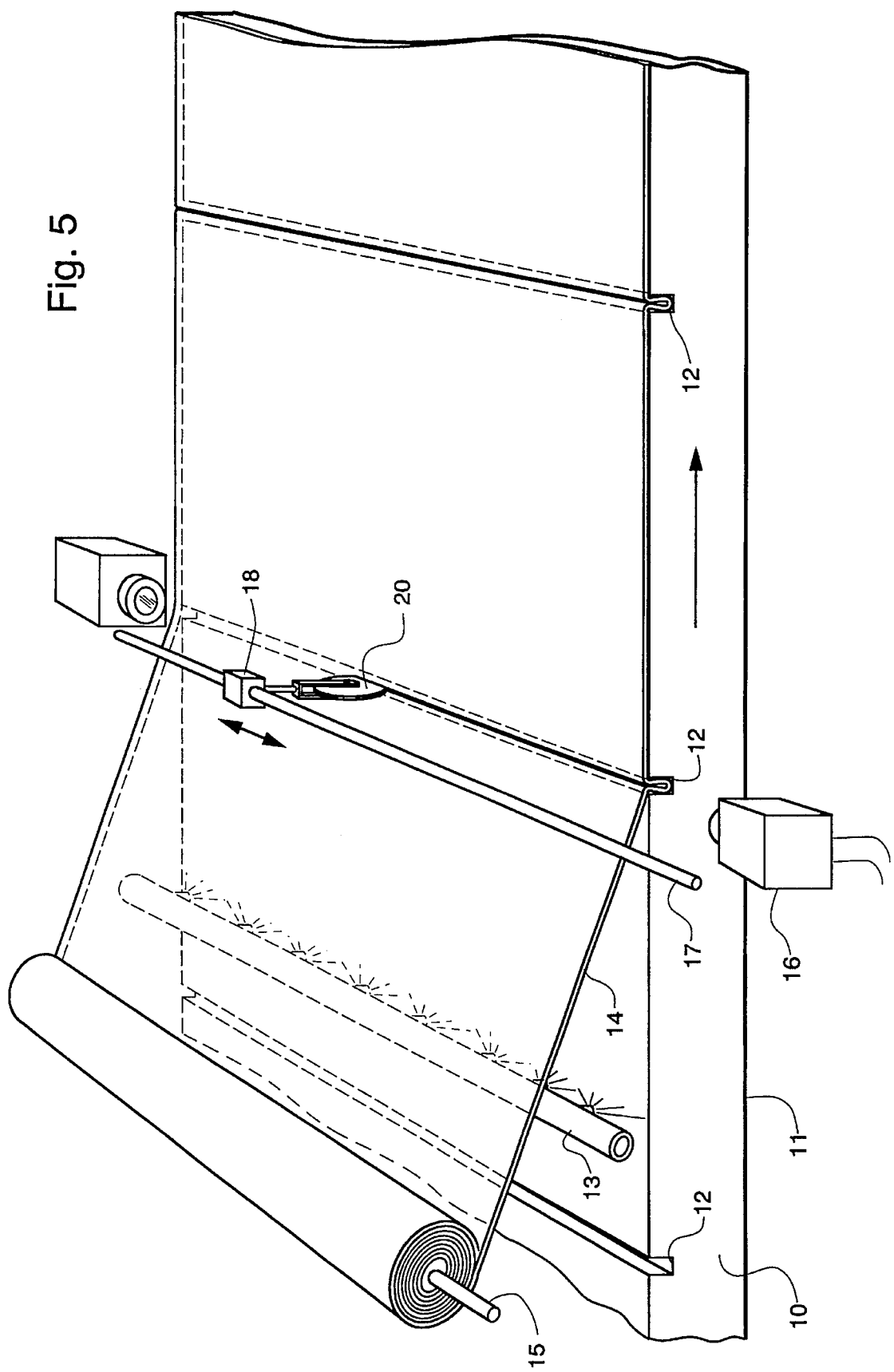

though the use of flexible coverings has origins centuries ago. The potential for such coverings to enhance the thermal and acoustic properties of a surface has also stimulated the desirability of flexible wall coverings, especially in conjunction with insulating materials and acoustical materials as part of a fabric covering system. With the increased popularity of these materials, designers have demanded increasing flexibility in presenting an aesthetic covering. Thus, designers are always seeking to reach beyond the limitations of existing techniques to achieve different "looks".

FABRIC-COVERED BOARD STRUCTURE AND PROCESS OF MANUFACTURE

This invention relates to a fabric-faced wallboard product having a modular appearance and a method for preparing the composite product without using separate modules. The composite of fabric and board forms a decorative panel with a grooved surface providing the appearance of a plurality of individual blocks, sections or modules.

BACKGROUND OF THE INVENTION

Flexible wall coverings, such as fabric coverings, have enjoyed increasing popularity in recent times, even though the use of flexible coverings has origins centuries ago. The potential for such coverings to enhance the thermal and acoustic properties of a surface has also stimulated the desirability of flexible wall coverings, especially in conjunction with insulating materials and acoustical materials as part of a fabric covering system. With the increased popularity of these materials, designers have demanded increasing flexibility in presenting an aesthetic covering. Thus, designers are always seeking to reach beyond the limitations of existing techniques to achieve different "looks".

One particularly desirable "look" is the "building blocks look". This combines a sense of strength, security and solidity with a feeling of warmth and insulation of the fabric. Heretofore, to obtain the appearance of individual blocks, sections, or modules it was necessary to install separate modules which were cut to size and covered with fabric prior to installation. This method requires a high labor input to fabricate and install the panels composed of the separate modules. Module alignment on the panel was further made difficult due to unavoidable size variations from one module to another.

It is an object of this invention to provide a process for producing full size panels having the appearance of modular pieces, usually one over the other. It is a further object to prepare such panels with a minimum of additional labor over that to produce a single modular piece. It is a still further object to provide a process and apparatus that operates substantially automatically to provide the modular-looking panel of this invention.

SUMMARY OF THE INVENTION

The decorative panel of this invention comprises a baseboard having a plurality of transverse grooves in at least one surface to provide the appearance of individual panels separated from one another by the grooves; and a fabric covering the grooved surface of the baseboard, the fabric being tucked into the grooves of the baseboard.

Preferably, the fabric-covered board structure comprises a baseboard composed of a grooved face, two sides and a back; a continuous adhesive coating over the grooved face, and a fabric covering the grooved face and adhered thereto. The fabric is preferably wrapped around the sides of the board and may be held on the back of the board using a strip of adhesive coating on the back or may be adhered or otherwise bonded only to the sides. The fabric is notched to form a "V-shaped" notch at the groove to permit smooth wrapping of the fabric around the sides of the panel.

The baseboard may be a conventional ceiling board, e.g., "Minaboard" ceiling board manufactured and sold by Armstrong World Industries, Inc. This board is of mineral wool construction and formed by the conventional water-laid process on paper making machinery. Since the product will be used on walls it must have some impact resistance to prevent surface damage. The impact resistance is secured by forming the board with a density of at least 1.5 lbs./board foot. If fiberglass is used, the density could be less and the natural recovery of the board surface provides the appearance of impact resistance. In this latter case, density could be as low as 0.5 lbs./board foot. The board can provide sound absorption using punched holes or other acoustical openings in the face of the board as described in U.S. Pat. No. 3,920,872, the disclosure of which is incorporated herein.

The process of the invention comprises cutting at least one groove in the surface of, and across the width of, a plain board to divide the board into modules; placing fabric over the surface of the grooved board; and bonding the fabric to the board while pushing the fabric overlying the grooves into the grooves.

BRIEF DESCRIPTION OF THE DRAWINGS AND THE BEST MODE

This invention will be more clearly understood by referring to the drawings and the detailed description that follows.

In the drawings:

FIG. 1 is a view, in perspective, of one embodiment of the panel of this invention;

FIG. 2 is a view, in cross-section, of an edge of the panel showing the fabric tucked in a groove;

FIG. 3 represents a flow sheet of the complete operation including the steps of the process of the invention;

FIG. 4 is a schematic view of the preferred apparatus for performing the significant steps of the process of the invention; and FIG. 5 is a schematic view of an alternative apparatus for performing the process of this invention.

DETAILED DESCRIPTION

In FIG. 3, the board 10 is fed into the first station 31, the "board infeed". It is passed under the adhesive applicator 13 (as shown in FIG. 5) at station 32 and then to the drying oven 33. The board 10 is then led to station 34 where the grooves 12 (as shown in FIGS. 4 and 5) are cut and the fabric 14 is unwound toward the board 10 and at station 35, is tucked into the grooves 12 (as shown in FIGS. 4 and 5) by the fabric tucking device 20. The processed boards are then fed to the finishing and storage stations, not shown.

Specifically, in FIG. 4, the plain panel or board 10, preferably a conventional mineral fiber board or fiberglass board, is fed between rubber covered drive rolls 11a and 11b. Grooves 12, having a width of about 3/32 inch and a depth of approximately 0.15 inch, had been scored or cut in board 10 in a prior operation. To create the individual modular appearance, the width of the horizontal groove should not exceed the dimension of the vertical space that will exist between two separate panels after the panels are installed side by side, i.e., about 3/32 inch. The width of the groove is also related to the thickness of the fabric to be tucked into the groove in a later step of the process. Grooves 12 may be spaced uniformly or randomly along the length of the panel 10.

An adhesive or other bonding agent had been previously roll-coated or sprayed onto the surface of the panel 10 through an applicator, not shown, at station 32 in FIG. 3. A very low application rate is used to prevent the adhesive from bridging the openings of the conventional perforations present for acoustical purposes.

A continuous length of fabric 14 having a "tie coat" previously applied to its lower surface is unwound from roll 15 onto the lightly applied layer of adhesive on the surface of the moving panel 10. Alternatively, the fabric 14 may be cut into proper lengths in a prior operation to fit over the panel 10. The length of fabric 14 should be sufficient to cover the two ends of panel 10, i.e., to be wrapped at least partly around the ends of the panel 10 to provide smooth edges. The manner in which fabric is combined with the fiberboard panel 10 and tucked into the grooves 12 is substantially identical to the process described for the continuous operation.

In the illustrated continuous operation, a photo detector device 16 "sees" groove 12 as it passes beneath the device 16 and signals the motor, not shown, to move the board a specific distance and to stop when groove 12 is aligned with the fabric "tucker" disk 20. The disk 20 is moved across the width of the panel 10 to tuck fabric 14 into groove 12. It is important to note at this juncture of the process that fabric 14 should not contact the adhesively-coated surface of panel 10 prematurely. Should fabric contact the surface prematurely, the force required to tuck fabric will tend to crush the edge of the groove and provide an unacceptable appearance.

In FIG. 5, the plain panel or board 10 is fed onto a moving belt or support 11. The grooves 12 had been scored or cut in the board 10 in a prior operation. The grooves 12 may be spaced uniformly or randomly along the length of the panel 10.

The adhesive or other bonding agent is roll-coated or sprayed onto the surface of the panel 10 through the applicator 13. As stated previously, a very low application rate should be used to prevent the adhesive from bridging the openings of the conventional perforations present for acoustical purposes.

A continuous length of fabric 14 having a "tie coat" previously applied to its lower surface is simultaneously unwound from roll 15 onto the lightly applied layer of adhesive on the surface of the moving panel 10.

In this operation, the photo detector device 16 signals the motor, not shown, that is adapted to move support 11, to stop when groove 12 is aligned with the fabric "tucker" disk 20. The disk 20 is moved across the width of the panel 10 to tuck fabric 14 into groove 12.

As shown in FIGS. 4 and 5, the disk 20 is movably attached to a transversely-placed rod 17 disposed across the width of the support 11 and attached thereto through the slidably mounted coupling 18 adapted to move transversely on rod 17 across the width of the panel 10. Other alternatives may also be used. For example, a single transversely disposed dull knife-edge adapted to rise from and fall into groove 12, thereby pushing fabric 14 into the groove may be used.

Normally, as shown in FIG. 1, fabric 14 is wrapped partially around the edge of the fiberboard panel 10 to provide a neat edge to the finished composite product. However, prior to such wrapping, it is important that a "V-shaped" notch, i.e., the triangular section 19, be cut out of fabric 14 at the groove 12. This permits the fabric 14 to conform evenly with the edge of board 10 even though fabric 14 has been gathered into two substantially parallel lengths 14a and 14b to fit snugly in groove 12, as shown in FIG. 2. The remaining steps of the operation, i.e., smoothing, cutting into wall panels, stacking, etc., are conventional.

The board 10 is a conventional ceiling board such as the "Soundsoak®" ceiling and wall boards sold by Armstrong World Industries, Inc. This board is of mineral wool construction and formed by a conventional water-laid process on paper making machinery. Since the product is used on walls it must have impact resistance to prevent surface damage. The impact resistance is secured by forming the board with a density of at least 1.5 lbs./board foot, and preferably 1.95 lbs./board foot. If fiberglass is used, density could be less and the natural recovery of the board surface functions to give the appearance of impact resistance. Here density could be as low as 0.5 lbs./board foot. The board should provide some sound absorption without punching holes or other acoustical openings in the face of the board. If increased sound absorption is desired, the board can be punched prior to applying the fabric.

The fabric 14 may be a woven or non-woven textile fabric or a porous vinyl fabric. It should be porous to sound so that sound waves will pass through the fabric and be absorbed by the board surface. A preferred fabric is a crepe weave polyester made by Guilford of Maine and sold under the trademark "Carina".

The adhesive is used for proper adherence of the fabric to the grooves in the board's surface. The adhesive should preferably be applied as a discontinuous coating so the coating is porous to sound. The coating may be sprayed on the surface as a light coating of about 20 grams/square foot, which is thin enough to permit sound to penetrate. An adhesive that has the ability to set up quickly and provide sufficient tack is:

| Material | % by Weight |
| --- | --- |
| "Covinax" 114 - Vinyl Acrylic Adhesive by Franklin Chemical | 36.0 |
| "Covinax" 324 - Vinyl Acrylic Adhesive by Franklin Chemical | 36.0 |
| Decabromodiphenyl oxide - fire retardant | 20.0 |
| Antimony Trioxide - fire retardant | 8.0 |
| | 100.0 |

What is claimed is:

1. A decorative panel comprising a baseboard having a plurality of transverse grooves in at least one surface of said baseboard dividing said baseboard into rectangular modules; and a fabric covering said surface of the baseboard, the fabric being tucked into the grooves in said surface of the baseboard to a greater depth than the width of the groove to provide the appearance of individual rectangular panels, one above another.

2. A fabric-covered board structure comprising a baseboard having a face with a plurality of transverse grooves in said face dividing said face into rectangles one above another; a continuous adhesive coating over the grooved face; a fabric covering the grooved face and adhered thereto, said fabric being tucked into the grooves to a greater depth than the width of the groove and wrapped around the sides of said baseboard to provide the appearance of individual rectangular fabric-covered panels, one above another.

* * * * *